United States Patent
Aalderink

(10) Patent No.: US 8,764,037 B2
(45) Date of Patent: Jul. 1, 2014

(54) WHEEL AXLE SUSPENSION HAVING CLAMP BODIES WITH A PROTRUSION FOR ATTACHING AN INDENTED TUBULAR AXLE TO TRAILING ARMS

(75) Inventor: Derk Geert Aalderink, Laren (NL)

(73) Assignee: VDL Weweler B.V., Apeldoorn (NL)

( * ) Notice: Subject to any disclaimer, the term of this patent is extended or adjusted under 35 U.S.C. 154(b) by 0 days.

(21) Appl. No.: 13/509,103

(22) PCT Filed: Nov. 10, 2009

(86) PCT No.: PCT/NL2009/000215
§ 371 (c)(1),
(2), (4) Date: May 10, 2012

(87) PCT Pub. No.: WO2011/059312
PCT Pub. Date: May 19, 2011

(65) Prior Publication Data
US 2012/0228847 A1    Sep. 13, 2012

(51) Int. Cl.
*B60G 7/02*    (2006.01)
*B60G 9/00*    (2006.01)

(52) U.S. Cl.
CPC .......... *B60G 9/003* (2013.01); *B60G 2204/148* (2013.01)
USPC ........ 280/124.116; 280/124.11; 280/124.128; 280/124.153

(58) Field of Classification Search
USPC .................... 280/124.116, 124.128, 124.131, 280/124.132, 124.148, 124.153, 124.175, 280/124.1, 124.149, 124.162, 124.164, 280/124.167, 124.11; 301/134, 135, 137
See application file for complete search history.

(56) References Cited

U.S. PATENT DOCUMENTS

| | | | | |
|---|---|---|---|---|
| 1,906,290 A | * | 5/1933 | Urschel | 267/52 |
| 2,129,656 A | * | 9/1938 | Dougherty | 267/52 |
| 2,929,617 A | * | 3/1960 | Gray et al. | 267/2 |
| 3,773,347 A | | 11/1973 | Traylor | |
| 4,643,406 A | * | 2/1987 | Mounier-Poulat et al. | 267/52 |

(Continued)

FOREIGN PATENT DOCUMENTS

DE    296 15 286 U1    10/1996
EP    1 273 464 A1    1/2003

(Continued)

OTHER PUBLICATIONS

Peter Schmitz, Vehicle axle element with bearing arm and axle tube connected therewith, Aug. 13, 2003, EPO, EP 1 334 848 A1, English Abstract.*
Peter Schmitz, Vehicle axle element with bearing arm and axle tube connected therewith, Aug. 13, 2003, EPO, EP 1 334 848 A1, Machine Translation of Description.*

*Primary Examiner* — James English
(74) *Attorney, Agent, or Firm* — Ladas & Parry LLP

(57) ABSTRACT

A wheel axle suspension having on both sides of a vehicle a trailing arm which extends in the longitudinal direction of the vehicle, a thin walled tubular axle body, which has attachment regions where the axle body is attached to the trailing arms. Each trailing arm is hingedly connected at the front, viewed in the direction of travel of the vehicle, to a bearing bracket which is arranged on the vehicle chassis. The suspension also comprises a pneumatic spring operational between each of the trailing arms and the chassis, and clamp bodies for clamping the axle body at the attachment regions thereof so as to attach the axle body to the trailing arms, as well as tensioning elements for providing the clamp force for the clamp bodies.

9 Claims, 5 Drawing Sheets

(56) References Cited

U.S. PATENT DOCUMENTS

| | | | |
|---|---|---|---|
| 5,037,126 A * | 8/1991 | Gottschalk et al. | 280/124.116 |
| 6,701,763 B2 * | 3/2004 | Varela | 72/61 |
| 6,951,266 B2 * | 10/2005 | Tournier | 188/130 |
| 7,066,479 B2 * | 6/2006 | Melton | 280/124.11 |
| 7,377,598 B2 * | 5/2008 | Doud et al. | 301/137 |
| 7,887,073 B2 * | 2/2011 | Drewes | 280/124.128 |
| 2010/0247231 A1 * | 9/2010 | Koschinat | 403/24 |
| 2011/0227308 A1 * | 9/2011 | Aalderink et al. | 280/124.116 |
| 2012/0056398 A1 * | 3/2012 | Wu | 280/124.157 |
| 2012/0080862 A1 * | 4/2012 | Westnedge et al. | 280/124.1 |

FOREIGN PATENT DOCUMENTS

| | | |
|---|---|---|
| EP | 1 334 848 A1 | 8/2003 |
| EP | 1334848 A1 * | 8/2003 |
| EP | 1 439 081 A1 | 7/2004 |
| EP | 1439081 A1 * | 7/2004 |
| NL | 1 022 395 C2 | 7/2004 |
| NL | 1 034 756 C1 | 1/2009 |
| WO | WO 2009014423 A1 * | 1/2009 |

\* cited by examiner

WHEEL AXLE SUSPENSION HAVING CLAMP BODIES WITH A PROTRUSION FOR ATTACHING AN INDENTED TUBULAR AXLE TO TRAILING ARMS

BACKGROUND OF THE INVENTION

The present invention relates to a wheel axle suspension of a vehicle such as a lorry or a trailer. Such a wheel axle suspension typically comprises a tubular wheel axle which is attached to so called trailing arms that are hingedly mounted to the vehicle chassis. Furthermore pneumatic springs are present which are operational between each of the trailing arms and the vehicle chassis.

In DE 296 15 286 a wheel axle suspension is disclosed in which the tubular axle body has a circular cross section and has attachment regions where the axle body is clamped to the trailing arms. The known axle body is deformed in the attachment zones to a non-circular shape. In particular each of the attachment zones is provided with one or more flattened regions in the circumference of the axle body in order to prevent changes in position of the axle body with respect to the trailing arm or a clamping element mounted against the trailing arm.

Vehicles like lorries and trailers provided with air sprung suspensions comprising trailing arms are susceptible to roll movements. The roll movements of the vehicle result in torsional loads on the axle body in the attachment regions thereof. Axle bodies with flattened sides are disadvantageous when considering the strength of the axle body to resist torsional loads.

In U.S. Pat. No. 1,906,290 a different type of wheel axle suspension is disclosed with a stack of leaf springs instead of a trailing arm. In this wheel axle suspension the axle body is flattened in an attachment region on an upper side. The flattened side of the attachment region is mounted against a flat leaf spring or a flat spring saddle. On the opposite side of the attachment region an indentation is provided. A clamp is tightened from below against the axle body, which clamp has a ridge fitting within the indentation. The flattened side and the indentation have for an object to prevent the rotational and longitudinal movement of the mounted axle body.

The present invention has for an object to provide an improved wheel axle suspension which is easy to manufacture and assemble and furthermore is universally applicable.

SUMMARY OF THE INVENTION

This object is achieved by a wheel axle suspension for a vehicle, comprising on both sides of the vehicle a trailing arm which extends in the longitudinal direction of the vehicle, a thin walled tubular axle body, which has attachment regions where the axle body is attached to the trailing arms, each trailing arm being hingedly connected at the front, viewed in the direction of travel of the vehicle, to a bearing bracket which is arranged on the vehicle chassis, as well as a pneumatic spring which is operational between each of the trailing arms and the chassis, wherein the wheel axle suspension furthermore comprises clamp bodies for clamping the axle body at the attachment regions thereof as well as tensioning elements for providing the clamp force for the clamp bodies, wherein the clamp bodies engage the axle body over a certain longitudinal distance of the attachment region and around virtually its entire circumference, wherein the axle body has a substantially circular cross section in the clamping regions and is provided with an elongated indent in each of the clamping regions, which indent extends in a longitudinal direction of the axle body and wherein at least one of the clamp bodies is provided with a protrusion that engages in the elongated indent.

The clamping bodies that enclose the axle body over a certain length on the entire circumference, have for an effect that it is prevented that the protrusion is "rolled" out of the indent under the influence of torsion loads on the axle.

The wheel axle suspension according to the invention has for an advantage that it comprises only two parts that have to be clamped on the axle body.

Another advantage is that the clamping structure is releasable if necessary. This provides the possibility to replace an axle body if necessary. No welds or other permanent attachments are used to lock the axle body with respect to the trailing arms.

Another aspect of the invention relates to a wheel axle suspension for a vehicle, comprising on both sides of the vehicle a trailing arm which extends in the longitudinal direction of the vehicle, a thin walled tubular axle body, which has attachment regions where the axle body is attached to the trailing arms, each trailing arm being hingedly connected at the front, viewed in the direction of travel of the vehicle, to a bearing bracket which is arranged on the vehicle chassis, as well as a pneumatic spring which is operational between each of the trailing arms and the chassis, wherein the wheel axle suspension furthermore comprises clamp bodies for clamping the axle body at the attachment regions thereof so as to connect the axle body to the trailing arms, as well as tensioning elements for providing the clamp force for the clamp bodies, wherein the clamp bodies engage the axle body over a certain longitudinal distance of the attachment region and around virtually its entire circumference, wherein the axle body has a substantially circular cross section in the clamping regions and is provided with an elongated indent in each clamping region, which indent extends in a longitudinal direction of the axle body, wherein an intermediate member is provided which has a protrusion that engages in the elongated indent in the axle body and which intermediate member is retained in position by the clamp bodies or one of the clamp bodies such that said protrusion engages in said elongated indent in the axle body.

The invention will be described in more detail with reference to the drawings.

DETAILED DESCRIPTION

Figure 1:
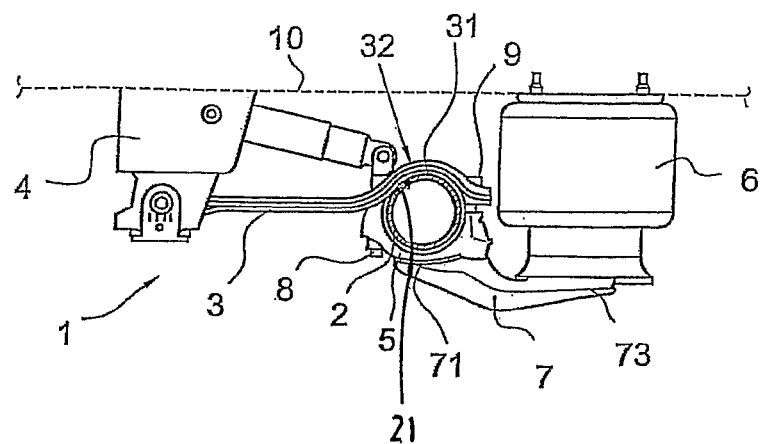
FIG. 1 shows a side elevational view of a wheel axle suspension according to the invention.

FIG. 1 shows a wheel axle suspension 1 for suspending a wheel axle from a vehicle chassis 10. The wheel axle has a tubular axle body 2 with a circular cross section.

Figure 3:
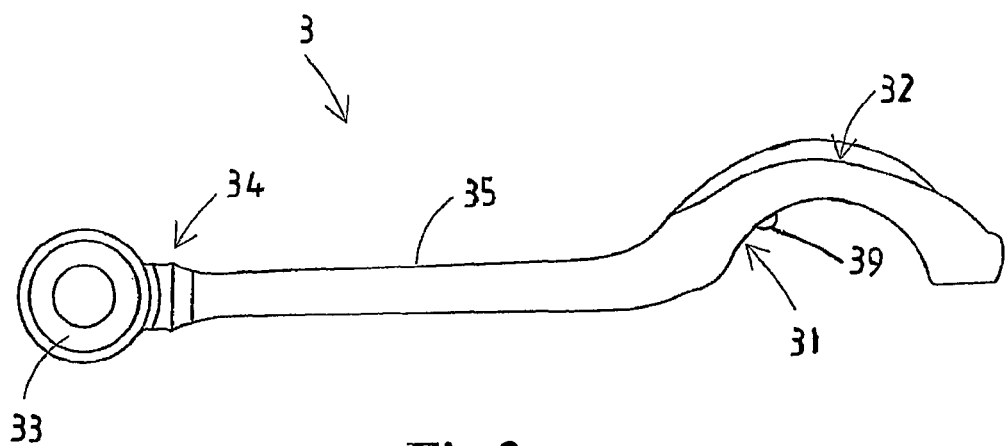
FIG. 3 shows a side elevational view of a trailing arm of the wheel axle suspension of FIG. 1.

The wheel axle suspension 1 comprises a trailing arm 3 on both sides of the vehicle. Each trailing arm 3 extends in the longitudinal direction of the vehicle and is at a front end 34 (see FIG. 3) hingedly attached to a bearing bracket 4 which is attached to the chassis 10. Thereto the trailing arm 3 has a mounting eyelet 33. The trailing arm 3 as shown in the figures is a flexible trailing arm, also referred to in the art as a spring arm, with a spring portion 35. It is noted however that the present invention is not limited to suspensions with flexible trailing arms and may just as well be performed with rigid trailing arms.

In the shown embodiment the trailing arm 3 has an integral clamp body 32 formed at its rear end. The axle body 2 is clamped against a curved contact region 31 of the clamp body 32 of the trailing arm 3. On the side of the axle 2 opposite of the contact region 31 another clamp body 5 engages the axle body 1. A pneumatic spring 6 is attached to the vehicle chassis 10 on the upper side and to a support arm 7 on the lower side.

Figure 2:
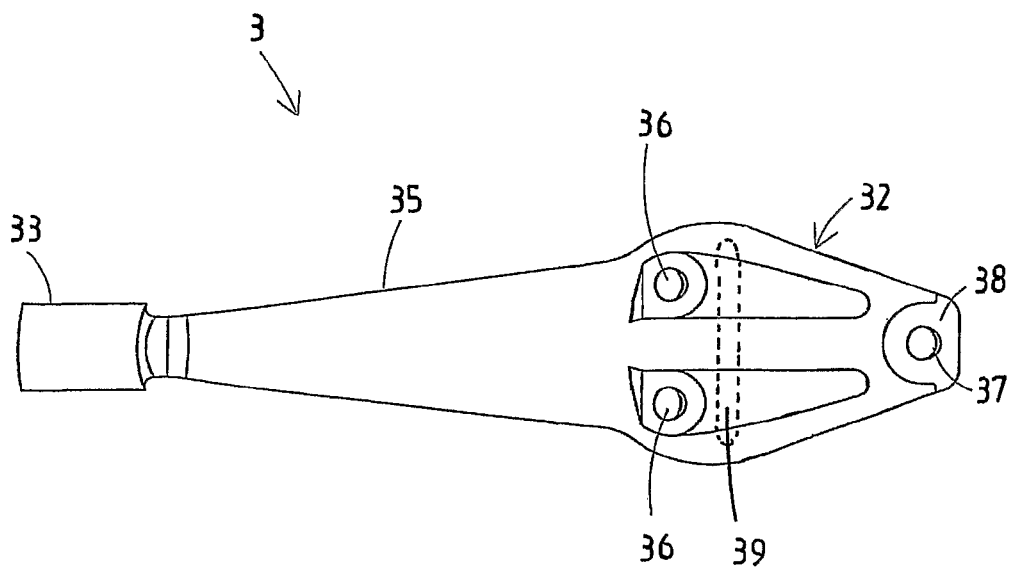
FIG. 2 shows a elevational view of a trailing arm of the wheel axle suspension of FIG. 1.

The clamp body 32 of the trailing arm 3 which forms the contact region 31, in top view, has an approximately triangular shape as is clearly visible in FIG. 2. The greatest width of the triangular shape is situated at the front of said clamp body 32 and the tip of the triangle being situated at the rear of the clamp body 32. Two bores 36 are provided near the wide front end portion of the clamp body 32 of the trailing arm which forms the contact region 31, and a single bore 37 is provided at the narrower rear end portion 38 of said clamp body 32.

The clamp body 5 in the shown embodiment is preferably a cast or forged metal part. The clamp body 5 has in the specific embodiment shown a substantially triangular shape.

The axle body 2 is clamped between the clamp body 32 and the clamp body 5 by means of three clamping bolts 8, 9, which extend through the bores in the clamp body 32 of the trailing arm 3 and the bores in the other clamp body 5. Said bolts 8, 9 cooperate with nuts 11 and 12.

The pneumatic spring support arm 7 is a separate part, preferably a cast or forged metal part. It has a generally elongate shape. The pneumatic spring support arm 7 is attached to the clamp body 5 by means of the clamping bolt 9 which extends through a rear bore in the clamp body 5 and the rear bore 37 in the clamp body 32 of the trailing arm 3. Thereto the support arm 7 for the pneumatic spring 6 has an aperture which is aligned with the rear bore in the portion 32 of the trailing arm 3 and the rear bore in the clamp body 5 respectively.

The clamp body 5 and the support arm 7 may be separate parts as is shown in the embodiment shown in FIG. 1. However, for the present invention the support arm 7 may also be formed integrally with the clamp body 5.

The clamp bodies 32 and 5 together surround the entire circumference of the axle body 2. Thereby the axle body 2 in its clamping region is kept in a circular shape, seen in cross section.

Figure 4:
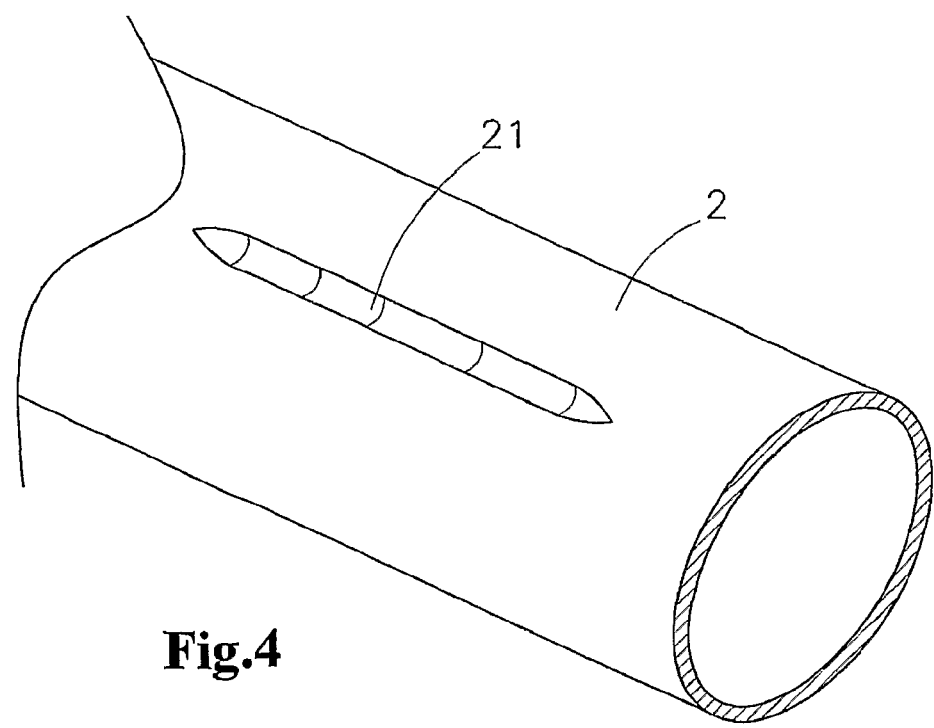
FIG. 4 shows in a perspective view a section of an axle body with a indentation.

In the clamping region of the axle body 2 is provided an indent 21 as is shown in FIG. 4. The indents 21 in the respective clamping regions of the axle body are in line with each other. In the preferred embodiment the indent 21 is a groove-like indent. In a possible embodiment the axle body is provided with one indent over its entire length, which long indent then comprises the indents 21 in the respective clamping regions. The elongated 21 indent has in cross section a rounded shape, e.g. a circle segment shape as is shown in the figures. Because the indents 21 in the respective clamping regions of the axle body 2 are in line with each other, the clamp bodies 32 of trailing arms 3 engage the axle body 2 in the correct orientation determined by the position of the protrusion 39 which falls within the indent. This has as a result that the trailing arms 3 do not have to be aligned after they have been mounted.

The indent 21 may be pressed in the axle body 2. During this process the tubular axle body 2 may be deformed locally a little to an oval shape. However, the shape remains substantially circular in cross-section. When the axle body 2 is clamped by the clamp bodies 5 and 32, the cross-section is deformed back to circular.

On the clamping surface 31 of the clamp body 32 is provided an elongate protrusion 39. The elongate protrusion 39 has generally a cross sectional shape of a circle segment. The elongate protrusion is integrally formed on the contact surface 31. The elongate protrusion 39 engages in the indent 21 in the axle body.

In the preferred embodiment, the indent 21 has a length which is greater than the width of the clamp bodies 32 and 5. This has the advantage that the axle body 2 may be used universally with wheel axle suspensions for vehicles with different track widths. Alternatively, the axle body may be provided with one indent over its entire length instead of two indents, each located in the clamping region of the axle body.

Figure 5:
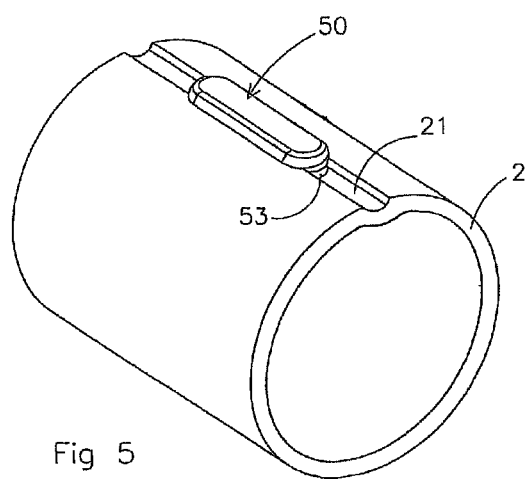
FIG. 5 shows in a perspective view a section of an axle body with a indentation with an intermediate member placed on the axle body.
Figure 6:
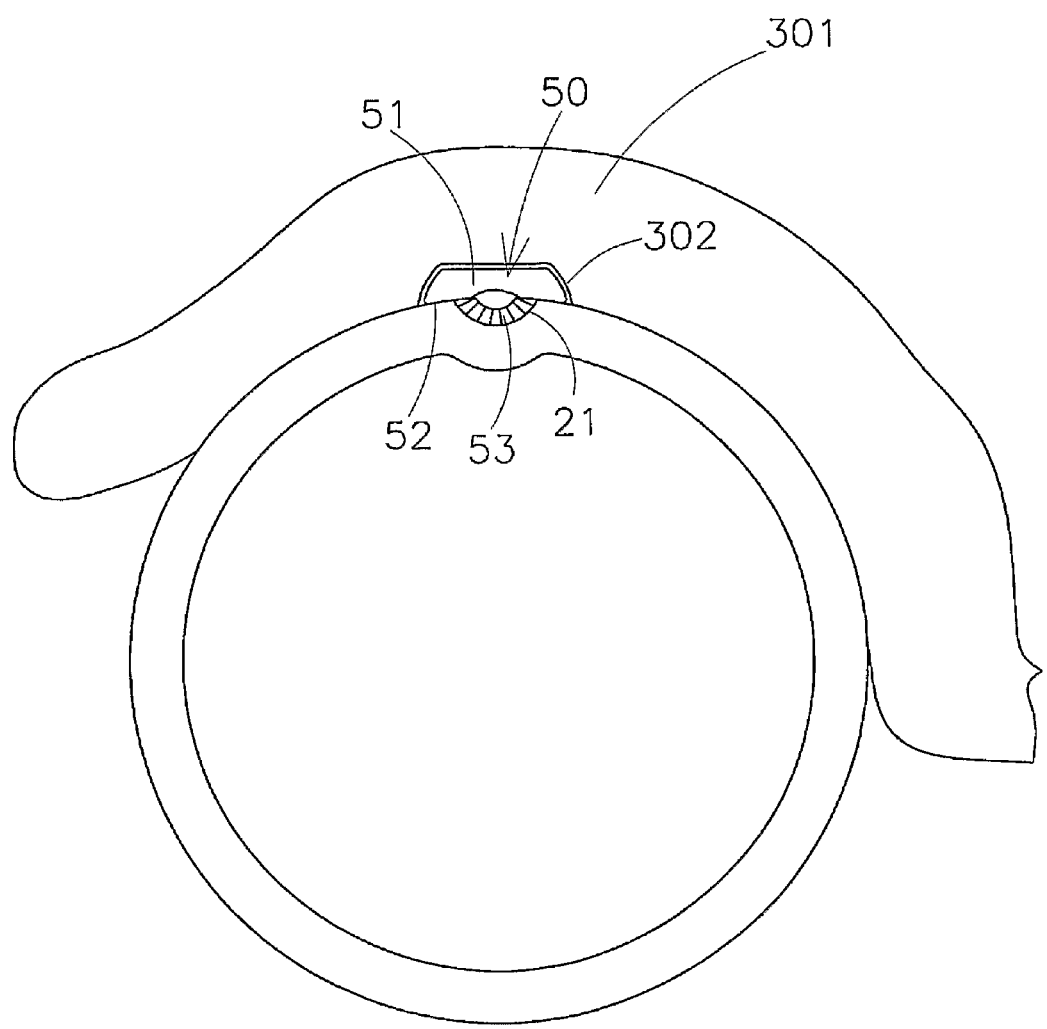
FIG. 6 shows a cross section of the axle body with the intermediate member of FIG. 5.

In FIG. 5 and FIG. 6 is disclosed a second aspect of the invention. In the figures is shown an axle body 2 with an elongate indent comparable to the one shown in FIG. 4.

In the indent is positioned an intermediate member 50 which has a main body 51 formed as a spline. The main body 51 has a contact surface 52 which in mounted state engages the axle body 2. On the contact surface 52 an elongate rounded protrusion 53 rounded protrusion 54 is integrally formed. One of the clamp bodies 301 is provided with an elongate recess 302. The main body 51 of the intermediate member 50 closely fits in the recess 302 in the clamp body 301. The protrusion 53 engages in the elongated indent 21 in the axle body 2.

The contact surface that lies 52 against the outer surface of the axle body 2, and the rounded protrusion 53 that is inserted in the indent 21 cooperate such that the protrusion 53 blocks rotational movements of the axle body 2 with respect to the intermediate member 50 when torsion loads are submitted to the axle body via the intermediate member 50. The contact surface 52 provides a blocking surface that the tendency of the rounded protrusion to roll out of the indent 21 is blocked.

The advantage of this embodiment is that it can be used universally with all kinds of wheel axle suspensions as long as one of the clamp bodies is provided with a recess in which the spline of the intermediate member fits. It must be noted that the clamp body 301 in this embodiment may be a separate part. However, an embodiment where the recess 302 is provided in clamp body which is integral with a trailing arm (see e.g. FIGS. 2 and 3) is envisaged as well. In that case the recess 302 for the spline may be forged into the curved surface 31 of the clamp body 32.

Figure 7:
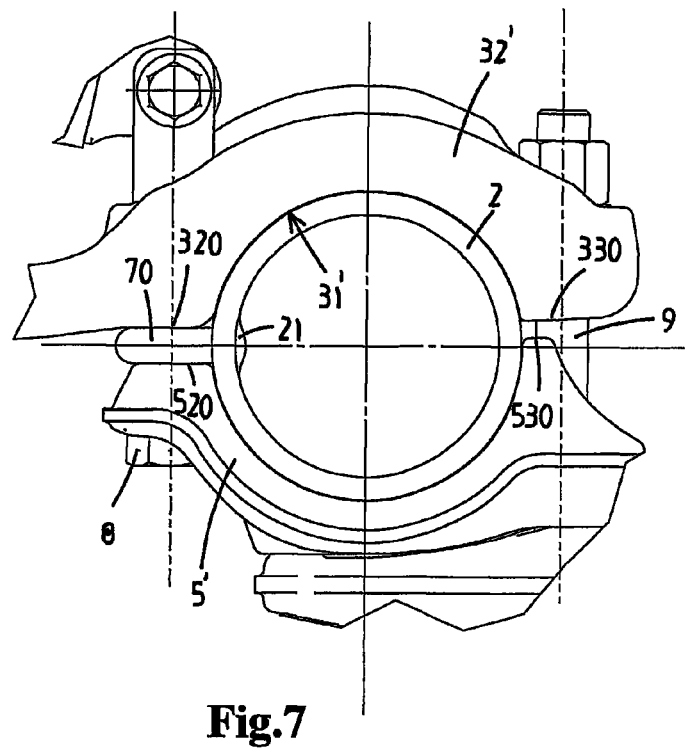
FIG. 7 shows an elevational side view of a wheel axle clamped between clamp bodies with an intermediate member clamped between them.
Figure 8:
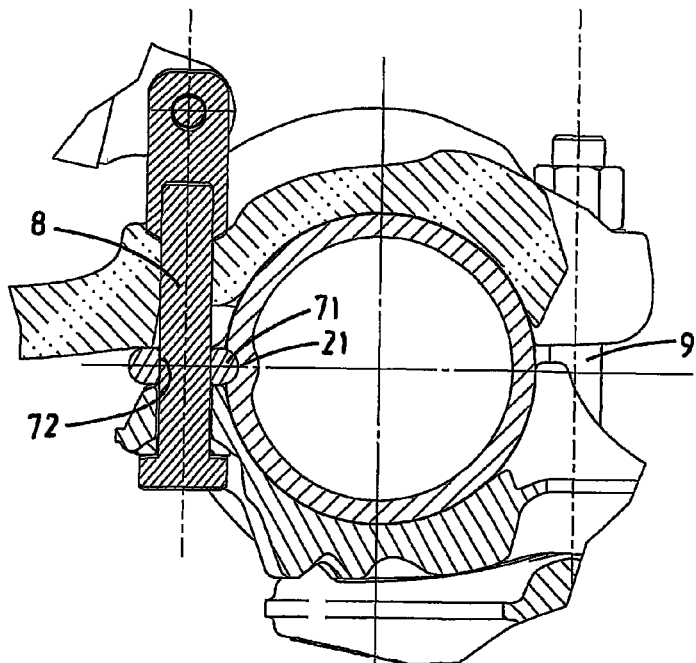
FIG. 8 shows a cross sectional view of the clamped wheel axle of FIG. 7.

FIG. 7 and FIG. 8 show an alternative embodiment of the second aspect of the invention. The clamp bodies 32' and 5' each have a curved contact surface against which the axle body 2 is received. Each of the clamp bodies 32', 5' has a front edge portion 320, 520 and a rear edge portion 330, 530 adjacent to the respective contact surfaces. The respective front edge portions 320 and 520 and rear edge portions 330 and 530 in the mounted state face each other, as can be seen in FIGS. 7 and 8.

In this embodiment an intermediate member 70 is provided. The intermediate member 70 comprises an elongated strip-like body which in the embodiment shown is clamped between the spaced apart front edge portions 320 and 520 of the clamp bodies 32' and 5'. One side edge portion 71 of the strip like body engages in the indent 21 in the axle body 2, as can be seen in FIG. 8. The side edge portion is considered to be similar to the form and function of the protrusion 53 of the intermediate member 50 shown in FIG. 5. The strip-like body of the intermediate member 70 is provided with through bores 72 for running through the shanks of the tensioning bolts 8 and 9.

The invention claimed is:

1. A wheel axle suspension for a vehicle, comprising on both sides of the vehicle a trailing arm which extends in the longitudinal direction of the vehicle, a thin walled tubular axle body, which has attachment regions where the axle body is attached to the trailing arms, each trailing arm being hingedly connected at the front, viewed in the direction of travel of the vehicle, to a bearing bracket which is arranged on the vehicle chassis, as well as a pneumatic spring which is operational between each of the trailing arms and the chassis, wherein the wheel axle suspension furthermore comprises clamp bodies for clamping the axle body at said attachment regions thereof so as to attach the axle body to the trailing arms, as well as tensioning elements for providing the clamp force for the clamp bodies, wherein the clamp bodies engage the axle body over a certain longitudinal distance of each of the attachment regions and around virtually its entire circumference, wherein the axle body has a substantially circular cross section in the attachment regions and is provided with an elongated indent in each of the attachment regions, which indent extends in a longitudinal direction of the axle body and wherein at least one of the clamp bodies is provided with a protrusion that engages in the elongated indent, wherein the indent has a length which is greater than the width of the clamp bodies.

2. The wheel axle suspension according to claim 1, wherein the indent is a groove-like indent.

3. The wheel axle suspension according to claim 1, wherein the axle body is provided with one indent over its entire length.

4. The wheel axle suspension according to claim 1, wherein the elongated indent has in cross section a rounded shape.

5. The wheel axle suspension according to claim 1, wherein one of the clamp bodies is an integral part of the trailing arm.

6. The wheel axle suspension according to claim 5, wherein the clamp body that is an integral part of the trailing arm is provided with the protrusion.

7. The wheel axle suspension according to claim 1, wherein the protrusion has a rounded cross section.

8. The wheel axle suspension according to claim 1, wherein the indents in the respective clamping regions are in line with each other.

9. A wheel axle suspension for a vehicle, comprising on both sides of the vehicle a trailing arm which extends in the longitudinal direction of the vehicle, a thin walled tubular axle body, which has attachment regions where the axle body is attached to the trailing arms, each trailing arm being hingedly connected at the front, viewed in the direction of travel of the vehicle, to a bearing bracket which is arranged on the vehicle chassis, as well as a pneumatic spring which is operational between each of the trailing arms and the chassis, wherein the wheel axle suspension furthermore comprises clamp bodies for clamping the axle body at said attachment regions thereof so as to attach the axle body to the trailing arms, as well as tensioning elements for providing the clamp force for the clamp bodies, wherein the clamp bodies engage the axle body over a certain longitudinal distance of each of the attachment regions and around virtually its entire circumference, wherein the axle body has a substantially circular cross section in the attachment regions and is provided with an elongated indent in each of the attachment regions, which indent extends in a longitudinal direction of the axle body and wherein at least one of the clamp bodies is provided with a protrusion that engages in the elongated indent, wherein the indent has a length exceeding the length of the protrusion so as to allow attachment of the axle body on different track widths to the trailing arms.

* * * * *